United States Patent [19]

Ohorodnik et al.

[11] 4,440,925

[45] Apr. 3, 1984

[54] PROCESS FOR MAKING FINE PARTICULATE NON-AGGLOMERATING CHLOROPOLYETHYLENE

[75] Inventors: Alexander Ohorodnik, Erftstadt; Hans W. Keuper, Cologne; Horst Semmler; Joachim Hardel, both of Brühl; Hermann Vierling, Hürth; Robert Willms, Knapsack, all of Fed. Rep. of Germany

[73] Assignee: Hoechst Aktiengesellschaft, Fed. Rep. of Germany

[21] Appl. No.: 347,308

[22] Filed: Feb. 9, 1982

[30] Foreign Application Priority Data

Feb. 14, 1981 [DE] Fed. Rep. of Germany ....... 3105404

[51] Int. Cl.$^3$ .............................................. C08F 8/22
[52] U.S. Cl. .................................... 528/487; 525/356; 525/358; 528/480; 528/490; 528/491
[58] Field of Search ...................... 525/358, 356, 480; 528/487, 490, 491

[56] References Cited

U.S. PATENT DOCUMENTS

| | | | |
|---|---|---|---|
| 3,071,569 | 1/1963 | Hoerger | 525/358 |
| 3,168,499 | 2/1965 | Orthner | 528/487 |
| 3,467,640 | 9/1969 | Kaupp | 525/358 |
| 3,634,385 | 1/1972 | Walles | 528/498 |
| 3,856,766 | 12/1974 | Klug | 525/358 |
| 3,935,181 | 1/1976 | Schoen | 525/358 |

FOREIGN PATENT DOCUMENTS

| | | | |
|---|---|---|---|
| 2343983 | 3/1975 | Fed. Rep. of Germany . | |
| 46-11190 | 3/1971 | Japan | 525/358 |

*Primary Examiner*—C. A. Henderson
*Attorney, Agent, or Firm*—Connolly and Hutz

[57] ABSTRACT

The disclosure relates to a process for making fine particulate, non-agglomerating chloropolyethylene by subjecting pulverulent polyethylene to a chlorination reaction in aqueous or aqueous/hydrochloric acid-suspension with chlorine gas at a temperature of about 20° to 140° C. in the presence of silicic acid and silicon oil, separating, washing and drying the chloropolyethylene. More particularly, the disclosure provides for the chlorination to be terminated and for the aqueous hydrochloric acid-suspension of chloropolyethylene to be then intensively mixed with an aqueous or aqueous/hydrochloric acid-dispersion having talc as well as an orthophosphoric acid mono- and/or diester or a polysiloxane by means of an emulsifier dispersed in it, and for the chloropolyethylene to be separated from the mixture, to be washed and dried.

11 Claims, No Drawings

PROCESS FOR MAKING FINE PARTICULATE NON-AGGLOMERATING CHLOROPOLYETHYLENE

BACKGROUND OF THE INVENTION

1. Field of the Invention

The present invention relates to a process for making fine particulate, non-agglomerating chloropolyethylene.

2. Description of the Prior Art

Chloropolyethylene (briefly termed CPE hereinafter) finds commercial use in the production of thermoplastic compositions; this has been fully described in German Patent Nos. 12 36 774; 12 66 969; 14 69 990 and 23 42 983; and in DE-OS No. 24 56 278. CPE is normally made by chlorinating low pressure polyethylene (briefly termed PE hereinafter) in aqueous phase. Needless to say, the chlorination results in the physical properties of the polyethylene being considerably modified. In the form of fine particulate powder, polyethylene has no distinct elastic properties, nor do its particles tend to agglomerate. As a result of its properties being modified, CPE on the other hand combines a rubber-like elasticity, which incidentally is highly desirable, with the undesirable tendency of its particles to undergo agglomeration. This is a problem which has been fully discussed e.g. in DE-AS No. 14 20 407 relating to the chlorination of PE having a linear molecular structure and a crystalline structure, and consisting of particles with a size between 0.1 and 300 microns.

In order to inhibit the agglomeration of particles during the chlorination of polyethylene in aqueous phase, it has been suggested in DE-PS No. 14 20 407 that this operation should be effected in the presence of inert addends. The addends specified are selected from silicic acid or kieselguhr, barium sulfate, powdered asbestos, titanium dioxide, graphite, silicon carbide, glass powder and halogenated plastics materials, such e.g. as polyvinyl chloride. By the operation just described, it is indeed possible to limit the agglomeration of CPE particles to a given extent, but it is impossible to retain in the CPE the particle size distribution initially found in PE. Technically adverse effects which originate from this fact have been discussed in German Patent Specification Nos. 22 60 525 and 23 43 983. To solve the problem, it has been suggested that the PE should be chlorinated with chlorine in aqueous phase in the presence of 0.1 to 2 weight % silicic acid and 0.01 up to 1 weight % silicon oil, based on the PE used. In the event of the PE being chlorinated as described in German Patent Specification No. 22 60 525 in the presence of silicic acid having the quality specified and in the presence of silicon oil, which preferably is a polysiloxane selected from the dimethylpolysiloxane series, it is actually possible for the particle-size distribution initially determined in PE to be retained also in the chlorinated product.

All these processing steps do, however, not permit the agglomeration of particles to be effectively inhibited during the work-up of the chlorinated mixture, i.e. during the separation of the solid matter from the suspension, during the washing out of hydrogen chloride adhering to the CPE, during the drying operation and especially during storage of the product. Needless to say, is is not allowable for any step which is taken in an attempt to avoid the agglomeration of particles to impair the quality of the final product or render its work-up difficult.

These are problems which have been referred to in German Patent Specification No. 23 43 983. It is more specifically described therein that the materials suggested in DE-AS No. 14 20 407 for use as addends inhibiting agglomeration, e.g. silicic acid or kieselguhr, on the one hand actually produce satisfactory results. On the other hand, however, they seriously affect the quality of the final product and also the rheological and mechanical properties of a blend made from CPE and PVC. In addition to this, it should be borne in mind that particle agglomeration also depends on the molecular weight of the PE used.

SUMMARY OF THE INVENTION

We have now found that the adverse effects which are normally encountered during the work-up of CPE prepared, for example, as described in German Patent Specification No. 23 42 983, by chlorinating PE of whatever molecular weight in aqueous phase in the presence of silicic acid and silicon oil, can definitely be avoided. To this end, we provide for talc to be applied, after chlorination and cooling of the suspension, if desired or convenient, on to the surface area of the CPE-particles. The addends used heretofore can basically be said to inhibit the agglomeration of particles just in the aqueous suspension as they fail to go on to the CPE-particles. To the extent to which these addends, e.g. silicic acid or kieselguhr, actually go on to the CPE-particles, they impair the rheological properties of the product which is obtained on blending CPE with PVC.

The present invention relates more particularly to a process for making fine particulate, non-agglomerating chloropolyethylene by subjecting pulverulent polyethylene to a chlorination reaction in aqueous or aqueous/hydrochloric acid-suspension with chlorine gas at a temperature of about 20° to 140° C. in the presence of silicic acid and silicon oil, separating, washing and drying the chloropolyethylene, which comprises: terminating the chlorination; cooling the aqueous/hydrochloric acid suspension of chloropolyethylene if necessary or convenient, and then intensively mixing it with an aqueous or aqueous/hydrochloric acid-dispersion having talc as well as an orthophosphoric acid mono- and/or diester or polysiloxane by means of an emulsifier dispersed in it; separating the chloropolyethylene from the mixture; and washing and drying the chloropolyethylene.

DETAILED DESCRIPTION

The polyethylene which is chlorinated preferably is low pressure polyethylene having a molecular weight between 10,000 and 2,500,000 and consisting of particles with a size of 0.1 up to 500 microns, and it is preferably chlorinated in the presence of 0.1 up to 2 weight % of silicic acid and 0.01 up to 1 weight % of silicon oil, the percentages being based on the polyethylene quantity. It is also preferable for the polyethylene to be chlorinated in hydrochloric acid with a strength of 5 up to 25%.

A further preferred feature of the present invention provides for the talc to be used in a proportion of about 2 to 6 weight %, for the orthophosphoric acid ester or polysiloxane to be used in a proportion of about 0.05 to 1 weight %, the percentages being based on the chloropolyethylene quantity, and for the dispersant to be used in a proportion of about 0.5 to 2.5 volume %, based on the volume of the chloropolyethylene suspension.

The ester radicals of the orthophosphoric acid mono- and/or diester are preferably alkyl radicals having from 10 to 20 carbon atoms or polyoxyalkylene radicals having from 4 to 20 carbon atoms. Useful polysiloxanes, for example, are those selected from the dimethylpolysiloxane series.

Orthophosphoric acid esters which are suitable for use in the process of this invention comprise e.g. compounds of the following formulae:

(a) $CH_3—(CH_2)_7—CH=CH—CH_2O—(CH_2—CH_2—O)_5—P(OH)_2O$
(b) $[CH_3—(CH_2)_7CH=CH—CH_2—O—(CH_2CH_2—O)_5]_2—P(OH)O$
(c) $[iso—C_{13}H_{27}O]_2—P(OH)O$
(d) $C_6H_2(C_4H_9)_3—O—(CH_2—CH_2—O)_4—P(OH)_2O$
(e) $[C_6H_2(C_4H_9)_3—O—(CH_2—CH_2—O)_4]_2—P(OH)O$
(f) $C_6H_5—O—(CH_2—CH_2—O)_6—P(OH)_2O$
(g) $[C_6H_5—O—(CH_2—CH_2—O)_6—P(OH)O$
(h) $C_4H_9—CH(C_2H_5)—CH_2—O—P(OH)_2O$
(i) $[C_4H_9—CH(C_2H_5)—CH_2—O]_2—P(OH)O$ The organo-silicon compounds called silicon oil or polysiloxane herein in accordance with customary technical usage are compounds which are based on the recurring unit of the general formula:

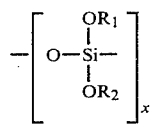

in which $R_1$ and $R_2$ stand for alkyl, aryl or aralkyl radicals and x stands for a whole number of 10 to 10,000, preferably 100 to 1,000.

A still further preferred feature of the present invention provides for the emulsifier to be a non-ionic emulsifier.

The application of talc on to the surface of the CPE-particles is typical of the present process which leaves the mechanical and rheological properties of the polymer unimpaired, and even permits these to become improved. The problem of the present process resides in the difficulty of having the talc in aqueous suspension fixed on the surface of the CPE-particles. The invention therefore provides for the talc dispersion to be used in admixture with suitable fixing agents.

The following Examples illustrate the invention:

EXAMPLE 1

(a) 155 g talc was suspended in 650 ml water, the suspension was admixed with an aqueous phosphoric acid ester dispersion, and the whole was stirred until a homogeneous dispersion was obtained. The phosphoric acid ester dispersion consisted of 252 ml water, 28 g of a mixture of the mono- and diester of orthophosphoric acid with 5-times ethoxylated oleyl alcohol and 3 g of an emulsifier, which was a polycondensation product of isotridecanol and ethylene oxide. The esters had the following constitutional formulae:

$CH_3—(CH_2)_7—CH=CH—CH_2—O—(CH_2—CH_2—O)_5—P(OH)_2O$ and $[CH_3—(CH_2)_7—CH=CH—CH_2—O—(CH_2—CH_2—O)_5]_2—P(OH)O$ (b) 2 kg pulverulent low pressure polyethylene was suspended in a chlorination reactor in 20 kg hydrochloric acid of 20% strength, the suspension was admixed with 1.6 g commercially available silicon oil AK 100 (this is a registered Trade Mark of Wacker-Chemie GmbH, München, Federal Republic of Germany) and 14 g AEROSIL (this is a registered Trade Mark of Degussa, Frankfurt/Main, Federal Republic of Germany) and chlorinated at temperatures within the range 20° to 140° C. with chlorine gas until the CPE contained 34.5 weight % chlorine. Next, the suspension was cooled with agitation down to about 40° C., admixed with the dispersion prepared as described under (a) above, and stirred for 30 minutes while it was allowed to further cool down to room temperature.

The CPE so obtained was filtered off, water washed and dried. Its particle-size distribution is shown in the Table hereinafter.

EXAMPLE 2

(a) 194.4 g talc was introduced into 370 ml water. Next, 135 g emulsified polysiloxane E 115 (this is a registered Trade Mark of Wacker-Chemie GmbH, München, Federal Republic of Germany) was added and the whole was vigorously stirred so as to obtain a homogeneous dispersion. E 115 is a dispersion of about 17 weight % polysiloxane and 3 weight % of an emulsifier in water.

(b) 2.5 kg low pressure polyethylene was suspended in 25 kg hydrochloric acid of 20% strength, the suspension was admixed with 2 g silicon oil AK 100 (this is a registered Trade Mark of Wacker-Chemie GmbH, München, Federal Republic of Germany) and 23 g AEROSIL (this is a registered Trade Mark of Degussa, Frankfurt/Main, Federal Republic of Germany) and the whole was chlorinated as described in Example 1. The chlorinated mixture was allowed to cool down to about 45° C. and introduced into the dispersion prepared as described under (a) above and the whole was stirred for 30 minutes while allowed to cool down to room temperature. The CPE was filtered off, water washed and dried.

The particle-size distribution of the CPE is indicated in the Table hereinafter.

EXAMPLE 3

(Comparative Example)

The procedure was as in Example 2, but the mixture obtained after the chlorination was terminated was not admixed with the dispersion prepared in Example 2(a).

The particle-size distribution of the CPE so made is shown in the following Table.

TABLE

| Product | Particle-size distribution (%) | | |
|---|---|---|---|
| | >500 μm | >315 μm | <315 μm |
| PE used | 0 | 17 | 83 |
| CPE of Ex. 1 | 7 | 29 | 64 |
| CPE of Ex. 2 | 3 | 30 | 67 |
| CPE of comparative Ex. 3 | 10 | 64 | 26 |

This Table indicates that the CPE treated in accordance with this invention cannot be said to differ significantly from the PE feed material as regards particle-size distribution, bearing in mind that CPE particles inevitably undergo an increase in volume during the chlorination.

The particle-size distribution determined for the CPE of comparative Example 3 on the other hand clearly indicates that its particles tend to agglomerate to coarser material.

We claim:

1. A process for making fine particulate, non-agglomerating chloropolyethylene by subjecting pulverulent polyethylene to a chlorination reaction in aqueous or aqueous/hydrochloric acid-suspension with chlorine gas at a temperature of about 20° to 140° C. in the presence of silicic acid and silicon oil, separating, washing and drying the chloropolyethylene, which comprises: terminating the chlorination; intensively mixing the aqueous/hydrochlorid acid suspension of chloropolyethylene with an aqueous or aqueous/hydrochlorid acid-dispersion containing (A) about 2 to 6 weight % of talc,
(B) 0.05 to 1 weight % of a fixing agent consisting of
  (a) an orthophosphoric acid monoester, an orthophosphoric acid diester or mixtures thereof wherein the ester radicals are alkyl radicals having 10 to 20 carbon atoms or polyoxyalkylene radicals having 4 to 20 carbon atoms or
  (b) a polysiloxane of the general formula

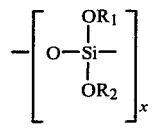

in which $R_1$ and $R_2$ stand for alkyl, aryl or aralkyl radicals and x stands for a whole number of 10 to 10,000,
the percentages of (A) and (B) being based on the chloropolyethylene quantity and
(C) 0.5 to 2.5% by volume of a non-ionic dispersant, based on the volume of the chloropolyethylene suspension;
separating the chloropolyethylene from the mixture, washing with water and drying the chloropolyethylene.

2. The process as claimed in claim 1, wherein the polyethylene is low pressure polyethylene having a molecular weight between about 10,000 and 2,500,000 and consisting of particles with a size of 0.1 up to 500 microns.

3. The process as claimed in claim 1, wherein the polyethylene is chlorinated in the presence of 0.1 up to 2 weight % of silicic acid and 0.01 up to 1 weight % of silicon oil, the percentages being based on the polyethylene quantity.

4. The process as claimed in claim 1, wherein the polyethylene is chlorinated in hydrochloric acid with a strength of 5 to 25%.

5. A process for making fine particulate, non-agglomerating chloropolyethylene comprising the steps of
subjecting pulverulent polyethylene to a chlorination reaction in aqueous suspension with chlorine gas at a temperature of about 20° to 140° C. in the presence of silicic acid and silicon oil,
terminating the chlorination;
intensively mixing the resulting aqueous suspension containing the chloropolyethylene with an aqueous dispersion comprising (A) about 2 to 6 weight % of talc,
(B) as a fixing agent, about 0.05 to 1 weight % of
  (a) an orthophosphoric acid monoester, an orthophosphoric acid diester or mixtures thereof wherein the ester radicals are alkyl radicals having 10 to 20 carbon atoms or polyoxyalkylene radicals having 4 to 20 carbon atoms or
  (b) a polysiloxane of the general formula

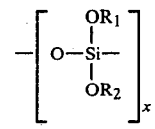

in which $R_1$ and $R_2$ stand for alkyl, aryl or aralkyl radicals and x stands for a whole number of 10 to 10,000,
the percentages of (A) and (B) being based on the chloropolyethylene quantity, and
(C) 0.5 to 2.5% by volume of a non-ionic dispersing agent, based on the volume of the chloropolyethylene suspension;
separating the chloropolyethylene from the mixture, washing with water and drying the chloropolyethylene.

6. A process as claimed in claim 5, wherein the aqueous suspension in which the chlorination takes place is an aqueous/hydrochloric acid suspension.

7. The process as claimed in claim 1, wherein the orthophosphoric acid ester corresponds to the following formula:
$CH_3-(CH_2)_7-CH=CH-CH_2-O-(CH_2-CH_2-O)_5-P(OH)_2O$ or
$[CH_3-(CH_2)_7-CH=CH-CH_2-O-(CH_2-CH_2-O)_5]_2-P(OH)O$ or
$[iso-C_{13}H_{27}O]_2-P(OH)O$ or
$C_6H_2(C_4H_9)_3-O-(CH_2-CH_2-O)_4-P(OH)_2O$ or
$[C_6H_2(C_4H_9)_3-O-(CH_2CH_2-O)_4]_2-P(OH)O$ or
$C_6H_5-O-(CH_2-CH_2-O)_6-P(OH)_2O$ or
$[C_6H_5-O-(CH_2-CH_2-O)_6]_2-P(OH)O$ or
$C_4H_9-CH(C_2H_5)-CH_2-O-P(OH)_2O$ or
$[C_4H_9-CH(C_2H_5)-CH_2-O]_2-P(OH)O$.

8. The process as claimed in claim 1, wherein the polysiloxane is a dimethylpolysiloxane.

9. A process as claimed in claim 5, wherein the aqueous dispersion is an aqueous/hydrochloric acid dispersion.

10. The process as claimed in claim 1, wherein the chlorination is terminated and the aqueous/hydrochloric acid-suspension of chloropolyethylene is cooled.

11. A process as claimed in claim 5, wherein the resulting aqueous suspension containing the chloropolyethylene is cooled subsequent to said terminating step.

* * * * *